United States Patent Office 3,471,421
Patented Oct. 7, 1969

3,471,421
CATALYTIC ESTERIFICATION OF EPOXY RESINS WITH ORGANIC STANNI COMPOUNDS
Geert C. Vegter and Feije H. Sinnema, Amsterdam, Netherlands, assignors to Shell Oil Company, New York, N.Y., a corporation of Delaware
No Drawing. Filed June 15, 1967, Ser. No. 646,201
Claims priority, application Netherlands, July 7, 1966, 6609502
Int. Cl. C08g 51/72
U.S. Cl. 260—18
10 Claims

ABSTRACT OF THE DISCLOSURE

When epoxy resins are esterified with fatty acids in the presence of organic stanni compounds such as the dialkyl tin carboxylates, the cooking time is significantly reduced, the viscosity increase of the reaction mixture during cooking is suppressed and the discoloration of the resulting esters is significantly reduced or eliminated entirely.

BACKGROUND OF THE INVENTION

Epoxy resins esterified with fatty acids are used in practice as binder compositions for paints, lacquers and varnishes. The preparation of these compositions, with or without the use of alkaline catalysts to accelerate the esterification reaction, is sufficiently known from the literature (see, for example, U.S. Patents 2,456,408 and 2,653,141; as well as the textbook "Epoxydverbindungen and Epoxyharzen" A. N. Paquin, Springer Verlag 1958, and the Journal Peinture, Pigments at Vernis 33 (1957) pp. 206–8).

The use of known alkaline catalysts, such as calcium oxide, sodium carbonate, zinc oxide, lead oxide, potassium hydroxide and calcium naphthenate for the esterification of epoxy resins with fatty acids, however, presents numerous serious drawbacks. Some of these catalysts are insufficiently active, so that the time necessary for the esterification reaction cannot be shortened as desired, while other compounds which do have an attractive catalytic activity have the drawback of causing an undesirable excessive rise in viscosity and discoloration of the reaction mixture during the esterification and particularly towards the end of the reaction.

Applicants have unexpectedly discovered that when certain organic tin compounds are used as catalysts for epoxy resin esterification, the esterification is considerably accelerated while significantly controlling the viscosity and discoloration, i.e., there is no undesirable rise in viscosity and no discoloration of the reaction mixture.

SUMMARY OF THE INVENTION

This invention relates to a process for the preparation of binder compositions prepared by the esterification of epoxy resins with fatty acids. More particularly, the invention provides an improved process for the preparation of epoxy resin esters of fatty acids wherein the esterification reaction is performed in the presence of certain organic tin compounds such as the dialkyl tin dicarboxylates.

It is therefore the primary object of the present invention to provide an improved process for esterifying epoxy resins with fatty acids wherein the esterification reaction is significantly accelerated without the undesirable increase in viscosity and discoloration. This and other objects will become apparent to one skilled in the art from the following disclosure.

DESCRIPTION OF THE PREFERRED EMBODIMENTS

The present invention provides an improved process for esterifying epoxy resins with fatty acids wherein certain organic stanni compounds are used as catalysts. The esterification reaction is significantly accelerated without the undesirable increase in viscosity and discoloration normally experienced when prior art catalysts such as calcium oxide, sodium carbonate, zinc oxide, etc., are employed.

The term "esterification of fatty acids" is used herein to indicate the direct reaction of epoxy groups and/or hydroxyl groups of the epoxy resins with the carboxyl groups of the fatty acids. Reactions in which esterified epoxy groups are formed by re-esterification of fatty acids, as for example fatty oils, with epoxy resins, are therefore excluded.

The polyepoxide materials which may be used in preparing the esters of the present invention comprise those organic materials which have more than one vic-epoxy group, i.e., more than one

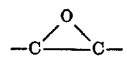

group, which group may be in a

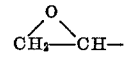

group, or in an internal position, i.e., a

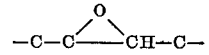

The polyepoxide may be saturated or unsaturated, aliphatic, cycloaliphatic, aromatic or heterocyclic and may be substituted with substituents such as chlorine, hydroxyl groups, ether radicals, and the like.

Examples of such polyepoxides include, among others, 1,4-bis(2,3-epoxypropoxy)benzene, 1,3-bis(2,3-epoxypropoxy)benzene, 4,4'-bis(2,3-epoxypropoxy)octane, 1,4-bis(2,3 - epoxypropoxy)cyclohexane, 4,4'-bis(2-hydroxy-3,4' - epoxybutoxy)diphenyl dimethylmethane, 1,3-bis-(4,5 - epoxypentoxy)-5-chlorobenzene, 1,4-bis(3,4-epoxybutoxy) - 2 - chloroxyclohexane, 1,3-bis(2-hydroxy-3,4-epoxybutoxy)benzene, 1,4 - bis(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include among others, resorcinol, catechol, hydroquinone, methyl resorcinol, or polynuclear phenols, such as 2,2-bis(4-hydroxyphenyl)propane (bisphenol A), 2,2-bis(4-hydroxyphenyl)butane, 4,4 '- dihydroxybenzophenone, bis(4 - hydroxyphenyl)-ethane, 2,2 - bis(4 - hydroxyphenyl)pentane 1,1,2,2-tetrakis(4 - hydroxyphenyl)ethane, 1,5 - dihydroxynaphthalene, and that class of phenol-formaldehyde resins known as the novolacs. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

The preparation of four suitable glycidyl polyethers of dihydric phenols is illustrated in U.S. 2,633,458 and are designated polyethers A, B, C, and D. Other suitable polyepoxides comprise the polyether F disclosed in U.S. 2,633,-458. Other very suitable polyepoxides are disclosed in U.S. 2,633,458.

The preferred epoxy resins discussed in this specification are resins which may be obtained by reacting divalent or polyvalent hydroxy compounds such as polyvalent alcohols, including glycerol, glycols, and pentaerythritol and polyvalent phenols such as bisphenol A, catechol, resorcinol, and the like, with epoxyhalogen compounds such as epichlorohydrin. Preferably, glycidyl polyether resins are used which have been prepared by condensation of epichlorohydrin with polyhydric alcohols or polyhydric phenols and more preferably with divalent phenols, for example under the action of alkalis, such as sodium hydroxide or potassium hydroxide. Very good glycidyl polyether resins are those which can be prepared with 2,2-di(4-hydroxyphenyl)-propane. The reaction products formed can be represented by the formula:

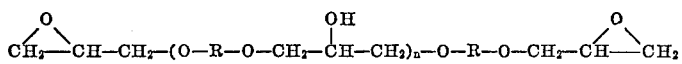

in which R represents the divalent diphenylpropane radical

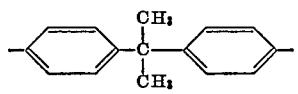

and $n$ has an average value of from about 0 to about 12. During the preparation, some of the terminal glycidyl groups may be hydrated to

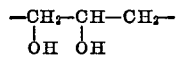

groups by reaction with water. If the glycidyl polyethers are mixtures of various components, $n$ may be a fractional number. A number of the chains present may contain phenol groups as terminal groups, while also part of the terminal glycidyl groups may be present in hydrated form. The number of reactive groups of the epoxy resin can be represented by the concept "hydroxyl functionality," which is understood to be the number of hydroxyl groups present per molecule plus twice the number of epoxy groups.

The molecular weight and thus also the value of $n$, identical to the number of hydroxyl groups per molecule, are dependent on the ratio of epichlorohydrin to 2,2-di(4-hydroxyphenyl)propane used for preparing the resins. In particular, resins in which the average value of $n$ is at least equal to 3 have proved to be very suitable base materials for the binder compositions to be prepared according to the invention.

Preference is given to polyglycidyl polyethers of 2,2-bis(4-hydroxyphenyl)propane having a molecular weight of 340–1000 and an epoxy equivalency of 170–600. Particularly preferred are polyglycidyl ethers of 2,2-bis(4-hydroxyphenyl)propane having a molecular weight of 700–1000 and an epoxy equivalent weight of 400–600, in view of the most favorable ratio between epoxy groups and free hydroxyl groups.

Preferred fatty acids are the saturated or ethylenically unsaturated monocarboxylic acids containing from 6–30 carbon atoms or dicarboxylic acids which may be obtained by dimerization of these monocarboxylic acids, if unsaturated. Very suitable acids are the fatty acids derived from drying or semi-drying oils, as for example, linseed oil, China wood oil, soyabean oil, coconut oil, hempseed oil, cotton seed oil, rapeseed oil, kapok oil, perilla oil, oiticica oil, dehydrated castor oil, fish oil and blown linseed oil or linseed oil thickened by heating. The fatty acids derived from these oils as well as tall oil (a mixture of fatty acids and resin acids) can be very well used for the preparation of binder compositions for end products which have the property of drying in the air.

Also suitable are the dimerized fatty acids, as for example, dimerized linseed oil or soyabean oil fatty acids.

Suitable saturated fatty acids are the acids containing at least 4 carbon atoms and preferably from about 6 to 26 carbon atoms, such as lauric acid, capric acid, palmitic acid, stearic acid, 2-ethylhexanoic acid, myristic, lignoceric, cerotic and caproic. Aliphatic acids in which the carboxyl groups are bound to tertiary and/or quaternary carbon atoms can also be used if binder compositions are envisaged for end products which can be cured by reaction with phenol-formaldehyde or amino-formaldehyde resins.

Suitable saturated aliphatic acids in which the carboxyl groups are bound to tertiary and/or quaternary carbon atoms are the alpha-branched, saturated, aliphatic monocarboxylic acids obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are sometimes called Koch acids in the art ("Carbonsaure-Synthese aus Olefinen, Kohlenoxyd und Wasser," Koch, Brennstoff-Chemie, November 1955, pages 321–328). Monocarboxylic acids branched at the alpha position can also be obtained according to Reppe's method. Of special value are the acids from mono-olefins containing 3 to 18 carbon atoms. Mixtures of olefins obtained by cracking paraffinic hydrocarbons, such as petroleum fractions, are preferably used as starting material. These mixtures may contain both branched and unbranched acylic olefins as well as cycloaliphatic olefins. By the action of formic acid or of carbon monoxide and water, a mixture of saturated acyclic and cycloaliphatic monocarboxylic acids is obtained therefrom.

Preferably, these acids are obtained by reacting with carbon monoxide and water, olefins having at least 3 carbon atoms in the molecule. This reaction takes place under the influence of acid catalysts, for example, phosphoric acid, sulfuric acid and complexes of phosphoric acid with boron fluoride. The reaction is more thoroughly described in U.S. 3,059,004, issued Oct. 16, 1962. As indicated in this patent, the carboxyl group adds on at the double bond and even when the double bond is terminal, the addition is such that a strong tendency for tertiary groups to be formed by isomerization. Branching at the double bond also provides a tertiary carboxyl group. Very attractive products are obtained when mono-olefins having at least 8 and not more than 18 carbon atoms in the molecule are thus converted into monocarboxylic acids. Preferably, more than 10% of the monocarboxylic acids will be tertiary in the carboxyl group.

Preferred saturated aliphatic monocarboxylic acids which may be used in the present process have the general formula:

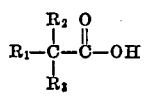

wherein $R_1$ and $R_2$ are the same or different alkyl radicals, $R_3$ is an alkyl radical or hydrogen. Particularly preferred monocarboxylic acids contain from 9 to 19 carbon atoms with 9 to 11 being especially preferred.

The esterification catalysts which are suitable for use in the present esterification process are the organic tin compounds having the general formula:

$$R_{4-n}-Sn-A_n$$

wherein R represents a hydrocarbon group, A is an acyl, acyloxy, alkoxy or aryloxy group and $n$ is a whole number having a value from 0 to 4.

Preferred catalysts are those wherein R represents alkyl, alkenyl, cycloalkyl, cycloalkenyl, aryl or alkylaryl groups, although alkyl groups are preferred; wherein $n$ has a value of 0 or 2; and wherein the A groups are acyloxy groups.

Excellent catalysts are especially the dialkyltin dicarboxylates, particularly those whose carboxylate groups have been derived from monocarboxylic acids containing from 6 to 20 carbon atoms or from dicarboxylic acids containing from 4 to 8 carbon atoms. Examples of highly effective catalysts include, among others, dibutyltin dilaurate, dihexyltin dipalmitate, diethyltin distearate, dilauryl di-2-ethylhexoate, dibutyltin dioctoate, dipropyltin diadipate, dioctyltin disuccinate, dibutyltin dimaleinate, dibutyltin diphthalate and dioctyltin diterephthalate. The tin compounds which contain carboxylate groups which have been derived from dicarboxylic acids may contain groups that are attached to a tin atom with only one of the carbonyloxy groups or with both carbonyloxy groups. In the case where both carbonyloxy groups are attached, they may be attached either to one and the same tin atom or to different tin atoms, so that the catalysts may have an an oligometric structure which, as a consequence, contains more than one tin atom and more than two carboxylate groups in the molecule.

Examples of suitable tetrahydrocarbyltin compounds include, among others, tetraethyltin, tetrabutyltin, tetralauryltin, diethyldihexyltin, diethyldicetyltin, dibutyldilauryltin, tributylstearyltin, dipropyldipalmityltin, diethyldiphenyltin, dibutyldiphenyltin, tributylphenyltin, and tetraphenyltin.

If desired, in addition to the stannous catalysts, other compounds giving an alkaline reaction, such as sodium carbonate, sodium hydroxide or potassium hydroxide can also be incorporated in the reaction mixture.

The esterification reaction will, as a rule, be performed under the conditions usual for this type of reaction, with or without the use of solvents such as toluene or xylene. Suitable reaction temperatures are between 150 and 300° C., and preferably between 200 and 265° C. The discharge of the water liberated during the reaction from the reaction mixture can be facilitated by stirring the mixture efficiently, if necessary, by blowing an inert gas through the reaction mixture such as nitrogen or carbon dioxide. Also, the water formed can be removed by azeotropic distillation with a small quantity of a suitable solvent, as, for example, xylene.

The ratios of fatty acids and epoxy resins in the reaction mixture and the time in which the esterification is carried out can vary within wide limits, dependent on whether reaction products with many or few esterified reactive groups (long or short "oil length") are envisaged. In general, it can be stated that suitable compositions are obtained when 15–95% of the hydroxyl functionality of the epoxy resins is esterified.

As a rule, the catalysts are used in concentrations of from 0.001 to 1.0 percent by weight, calculated on the weight of the epoxy resin, and preferably, the concentration of the catalysts is between 0.005 and 0.05 percent by weight.

The esterified reaction products obtained according to the invention may be worked up in any known way to paints, lacquers, or varnishes, to which components such as pigments, thinners, driers or siccatives, phenol-formaldehyde resins or amino-formaldehyde resins may be added. Also, before the paint compositions are made, the binders may be modified by reaction with di- or polycarboxylic acids and, if necessary, di- or polyvalent alcohols, or by reaction with styrene or vinyltoluene.

In order to illustrate the invention more fully some specific examples are given. The reactants, their proportions and other specific ingredients are presented as being typical and various modifications can be made in view of the foregoing disclosure and discussion without departing from the spirit or scope of the specification or of the claims. Unless otherwise stated, parts and percentages are by weight.

In all of the following experiments, the reactants, catalysts and solvent were placed in a reactor and cooked at 240° C. for 5 hours. In all instances nitrogen was passed through the reactor and all water formed during the reaction was removed from the reaction mixture by azeotropic distillation with xylene.

The epoxy resin (Resin I) used for the esterification in Experiments 1–5 was a condensation product of epichlorohydrin and 2,2-bis-(4-hydroxyphenyl)propane having the following properties:

| | |
|---|---|
| Epoxy equivalent weight | 900 |
| Molecular weight | 1400 |
| Average value of $n$ | 3.7 |
| Softening point (Durrans' method) | 101 |

Example I

Experiment 1:

Esterification recipe:

| | |
|---|---|
| Epoxy resin (Resin I) | 150 g. |
| Fatty acid | Dehydrated castor-oil fatty acid, 100 g. |
| Solvent | Xylene, 9 g. |
| Temperature | 240° C. |
| Reaction time | Maximum 5 hours (including one-hour heating-up period) |
| Catalyst | Dibutyltin dilaurate, 105 mg. |

During the reaction samples were taken at times shown in Table I for the determination of acid value and viscosity of the reaction mixture. The acid value was determined in $mn$ KOH/g. and the viscosity is expressed in centistokes, measured in a 60% by weight solution in xylene at 25° C.

Experiment 2.—The esterification recipe and procedure were identical to that of Experiment 1 except that the catalyst was 87 mg. of dibtyltin dimaleinate.

Experiments 3–5.—The esterification recipe and procedure were identical to that of Experiment 1 except that the catalyst in Experiment 3 was 22 mg. of ZnO; in Experiment 4, 50 mg. of NaOH; and in Experiment 5, no catalyst was used.

From the data presented in Table I, it is clear that two organic tin compounds (dibutyltin dilaurate and dibutlytin dimaleinate) effect a very rapid decrease in the acid value, while the viscosity of the reaction mixture does not increase to an unacceptable high value during the esterification.

The ZnO used for comparison was found to be capable of effecting an appreciable acceleration of the esterification reaction, but caused an adversely sharp rise in viscosity of the reaction mixture, as is apparent from the acid value and viscosity measurements. It will be noted that the NaOH has hardly any effect on the esterification as indicated by the acid values.

Example II

The procedure of Example I (Experiments 1–5) was substantially repeated wherein 100 g. of a condensate of epichlorohydrin and 2,2 - bis(4-hydroxyphenyl)propane having an average molecular weight of 2900, an epoxy equivalent weight of 1850, a softening point (Durrans' method) of 128, and an average value of $n$ of 8.8 esterified with 115 g. of linseed oil fatty acid. Related results were obtained.

TABLE I

| Experiment No. | Catalyst | Reaction time, hours | | | | | | | | | |
|---|---|---|---|---|---|---|---|---|---|---|---|
| | | 1 | | 2 | | 3 | | 4 | | 5 | |
| | | Acid value | Viscosity | Acid value | Viscosity | Acid value | Viscosity | Acid value | Viscosity | Acid value | Viscosity |
| 1 | Dibutyltin dilaurate | 9.6 | 1,325 | 2.4 | 1,420 | 0.05 | 1,620 | | 1,760 | | |
| 2 | Dibutyltin dimaleinate | 9.5 | 1,340 | 1.8 | 1,750 | 0.02 | 1,750 | | 1,860 | | |
| 3 | Zinc oxide | 11.1 | 1,650 | 4.2 | 1,690 | 1.8 | 1,820 | 0.03 | 2,320 | 0.02 | 2,950 |
| 4 | Sodium hydroxide | 12.4 | 1,100 | 6.9 | 1,170 | 4.2 | 1,200 | 2.5 | 1,210 | 0.07 | 1,220 |
| 5 | None | 12.5 | 1,410 | 7.2 | 1,560 | 4.5 | 1,750 | 2.7 | 1,960 | 0.02 | 2,320 |

We claim:

1. A process for the preparation of epoxy resin esters which comprises reacting at 150 to 300° C. (1) a polyepoxide containing more than one vic-epoxy group in the molecule with (2) a fatty acid containing from 6 to 30 carbon atoms in the presence of (3) from 0.001 to 1.0% by weight of the polyepoxide of an organic tin compound having the general formula:

$$R_{4-n}\text{—Sn—}A_n$$

wherein R is a hydrocarbon group, A is selected from the group consisting of acyl, acyloxy, alkoxy and aryloxy groups and $n$ is a whole number having a value from 0 to 4, said fatty acid being employed in amounts wherein from 15 to 95% of the hydroxyl functionality of the polyepoxide is esterified.

2. A process as in claim 1 wherein R is an alkyl group, A is an acyloxy group, and $n$ has one of the values 0 and 2.

3. A process as in claim 1 wherein the organic tin compound is a dialkyltin dicarboxylate.

4. A process as in claim 3 wherein the dialkyltin dicarboxylate is dibutyltin dilaurate.

5. A process as in claim 3 wherein the dialkyltin dicarboxylate is dibutyltin dimaleinate.

6. A process as in claim 1 wherein the polyepoxide is a glycidyl polyether of a polyhydric compound selected from the group consisting of polyhydric alcohols and polyhydric phenols.

7. A process as in claim 1 wherein the polyepoxide is a glycidyl polyether of 2,2-bis(4-hydroxyphenyl)propane.

8. A process as in claim 7 wherein the glycidyl polyether contains at least 3 hydroxyl groups.

9. A process as in claim 1 wherein the fatty acid is an ethylenically unsaturated monocarboxylic acid.

10. A process as in claim 1 wherein the fatty acid is derived from drying or semi-drying fatty oils.

References Cited

UNITED STATES PATENTS

| 3,208,955 | 9/1965 | Proops | 260—18 X |
| 2,720,507 | 10/1955 | Caldwell | 260—75 |
| 2,575,440 | 11/1951 | Bradley | 260—410.5 |
| 2,456,408 | 12/1948 | Greenlee | 260—18 |

DONALD E. CZAJA, Primary Examiner

C. WARREN IVY, Assistant Examiner

U.S. Cl. X.R.

260—19, 21, 831, 834, 836